US008336926B2

(12) United States Patent
Tober et al.

(10) Patent No.: US 8,336,926 B2
(45) Date of Patent: Dec. 25, 2012

(54) SAND DISCHARGE DEVICE FOR A RAIL VEHICLE

(75) Inventors: Hubert Tober, Wolfsgraben (AT);
Stefan Tober, Wolfsgraben (AT)

(73) Assignee: MBM Holding GmbH, Purkersdorf (AT)

( * ) Notice: Subject to any disclaimer, the term of this patent is extended or adjusted under 35 U.S.C. 154(b) by 310 days.

(21) Appl. No.: 12/730,293

(22) Filed: Mar. 24, 2010

(65) Prior Publication Data

US 2011/0089704 A1   Apr. 21, 2011

(30) Foreign Application Priority Data

Oct. 16, 2009 (AT) .............................. GM 654/2009
Nov. 5, 2009 (AT) .............................. A 1759/2009

(51) Int. Cl.
*B60B 39/08* (2006.01)
(52) U.S. Cl. ............ 291/11.2; 291/3; 291/11.3; 291/41; 291/46
(58) Field of Classification Search ................ 291/3, 10, 291/11.1, 11.2, 11.3, 12, 13, 25, 41, 46, 1; 188/35; 239/173, 174, 172, 290; 280/757
See application file for complete search history.

(56) References Cited

U.S. PATENT DOCUMENTS

| 1,755,643 | A | | 4/1930 | Gapp |
| 1,815,472 | A | * | 7/1931 | Hanlon et al. ................ 291/11.2 |
| 2,243,243 | A | | 5/1941 | Campbell |
| 2,352,252 | A | | 6/1944 | Canetta |

FOREIGN PATENT DOCUMENTS

| DE | 2556351 A1 | 7/1977 |
| DE | 20217390 U1 | 3/2003 |
| DE | 10333637 A1 | 2/2005 |
| EP | 1182109 A1 | 2/2002 |
| EP | 1418108 A1 | 5/2004 |
| EP | 1470981 A1 | 10/2004 |
| GB | 191328725 A | 4/1914 |

OTHER PUBLICATIONS

Excerpt from Search Report dated Aug. 31, 2010 for A 1759/2009.
Search Report dated Jan. 14, 2011 for EP 10450156.
Search Report dated Apr. 26, 2010 for GM 654/2009.

* cited by examiner

*Primary Examiner* — Mark Le
(74) *Attorney, Agent, or Firm* — Design IP

(57) ABSTRACT

A suction nozzle insert is provided for arranging in a storage container of a sand discharge device of a rail vehicle, through which compressed air can flow in succession through a nozzle, an injection chamber, a venturi pipe and then a sand feed pipe, wherein the injection chamber and the venturi pipe are located in a first hollow chamber, and furthermore at least one suction channel which connects the storage container with the injection chamber is provided in the housing of the suction nozzle insert, wherein the housing has a second hollow chamber which is arranged between the compressed air pipe and the nozzle, and at least one at least partially closable air channel is provided between this second hollow chamber and the first hollow chamber, wherein the air channel inlet lies in the second hollow chamber and the air channel outlet lies in the first hollow chamber.

20 Claims, 2 Drawing Sheets

SAND DISCHARGE DEVICE FOR A RAIL VEHICLE

CROSS-REFERENCE TO RELATED APPLICATIONS

This application claims priority from Austrian Patent Application No. GM 654/2009, filed Oct. 16, 2009 and Austrian Patent Application No. A 1759/2009, filed Nov. 5, 2009.

FIELD OF THE INVENTION

The invention relates to a suction nozzle insert for arranging in a storage container of a sand discharge device of a rail vehicle, wherein the suction nozzle insert has a housing with a first hollow chamber which is open at the bottom to which a sand feed pipe can be connected, and a cover section at its top end, and an air stream can flow through the suction nozzle insert parallel to its central axis in the direction of the sand feed pipe, wherein the air stream is fed in by a compressed air pipe and flows in succession through a nozzle, a venturi pipe and then the sand feed pipe, wherein the injection chamber and the venturi pipe are located in the first hollow chamber, and furthermore at least one suction channel which connects the storage container with the injection chamber is provided in the housing.

The invention also relates to a method for discharging a gritting material such as braking sand with a sand discharge device having an above-mentioned suction nozzle insert.

BACKGROUND OF THE INVENTION

Sand discharge devices for rail vehicles have been known for a long time. As a rule, such a sand discharge device has a discharge unit and a storage container, which is filled with sand, and from which the sand is fed onto the rail to the wheels of the rail vehicle in various ways in order to improve the traction of the rail vehicle when accelerating and braking.

Within the framework of this disclosure, the term "sand" equally describes the quartz sand which is normally used and also other alternative sand-like media (granular materials) for increasing the friction between wheel and rail, such as metal oxides for example. Accordingly, within the framework of this disclosure, the term sand discharge device is also used for those devices which discharge the said alternative gritting materials.

In a widely used variant, the lower region of the storage container is designed in the form of a funnel. By means of a suction or pressure nozzle insert which is arranged at the bottom of the funnel-shaped region and acts as a discharge unit and is usually operated by compressed air, the sand is sucked out of the storage container and transported through sand feed pipes to in front of the wheels of the rail vehicle.

For various reasons, blockages of the sand feed pipes can occur during operation of the sand discharge device, for example due to the effect of moisture on a residual quantity of sand which has remained in the sand feed pipe from an earlier sanding operation, which can lead to agglutination or even freezing of the sand in the sand feed pipe.

It is therefore necessary for the sand feed pipe to be emptied from time to time by blowing air through it, that is to say compressed air only without the addition of sand. There is a range of solutions for this, which, however, predominantly try to prevent sand from being sucked from the storage container by means of moving parts so as to be able to blow the sand feed pipes free with compressed air only. However, if such devices are used for extended periods, these moving parts can become jammed by the sand thus resulting in operational faults and leaks.

When alternative gritting materials such as metal oxides are used, operational faults can occur with sand discharge devices according to the prior art: metal oxides have a higher weight than quartz sand, for example, therefore a greater quantity of air or a higher air pressure is required for sanding, which, with known devices, is only achieved with difficulty.

BRIEF SUMMARY OF THE INVENTION

The invention provides a simple and inexpensive device with which the functionality of the sand discharge is ensured with any gritting material and the sand feed pipes can be kept free even with extended use.

According to the invention, this is achieved with a suction nozzle insert of the kind mentioned in the introduction in that the cover section has a second hollow chamber which is arranged between the compressed air pipe and the nozzle, and that at least one at least partially closable air channel is provided between this second hollow chamber and the first hollow chamber, wherein the air channel inlet lies in the second hollow chamber and the air channel outlet lies in the first hollow chamber. In a variant of the invention, the air channel is completely closable.

The solution according to the invention enables the suction nozzle insert and the sand feed pipes to be "emptied" or "blown free" by blowing air through them. In doing so, the air channel is either opened or closed. The opening and closing is carried out by means of a device which can be provided at the air channel inlet, in the air channel or at the air channel outlet.

Furthermore, an exemplary solution according to the invention enables gritting materials which are heavier than the quartz sand which is normally used to be discharged. The provision of the air channel means that the full quantity of compressed air is always available in the first hollow chamber. At the same time, the air channel is not only either opened or closed, but also varied in its cross section in order to vary the amount of air passing through. At the same time, a mode of operation is also conceivable during which the air channel always remains in the state of a particular cross section—so that, for example, 70 percent of the air channel cross section remains open.

If the air channel is closed, the stream of compressed air passes through the nozzle into the injection chamber, sucks braking sand from the storage container and blows a sand/compressed air mixture into the sand feed pipe. If the air channel is open, the compressed air passes through the air channel and not, or only to a small extent, through the nozzle. In this way, the injection chamber is circumvented in the form of a bypass, no braking sand is sucked from the storage container and the sand feed pipe is "emptied" by blowing air through it. As in this case there are no moving parts of any kind in the sand area, operational faults due to the braking sand are practically eliminated. This ensures correct operation over extended time periods and minimises maintenance effort. Favourable manufacturing costs are also guaranteed as a result of the simple design.

When the air channel is partially open, some of the compressed air passes through the nozzle and produces a vacuum in the injection chamber, which sucks up the braking sand (or gritting material), while the remaining compressed air flows through the air channel and joins with the compressed air/sand (or gritting material) mixture in the first hollow chamber. The partial opening of the air channel therefore controls the distribution of compressed air through nozzle and air channel.

It is therefore also possible to discharge material which is heavier than the braking sand normally used. However, metal oxides are up to three times as heavy as the gritting sand normally used. With conventional sand discharge devices, operational faults can therefore occur if the compressed air passing through the nozzle is not sufficient to convey the compressed air/gritting material mixture through the sand feed pipe. With the suction nozzle insert according to the invention, a larger volume of air is available for discharging the mixture, as the diverted air after the injection chamber is also fed in once more in addition to the air which passes through the nozzle.

The second hollow chamber is desirably arranged in the cover section.

At the same time, it is an advantage when the "bypass"-like air channel runs essentially parallel to the central axis of the suction nozzle insert. This guarantees optimum compressed air flow through the air channel.

In order to ensure that, when required, the compressed air chooses the "bypass" through the air channel as completely as possible, it is beneficial when the diameter of the air channel is several times the diameter of the nozzle. As a result, the compressed air flows more easily through the air channel than through the nozzle, the production of a vacuum in the injection chamber which sucks the braking sand out of the storage container is avoided, and the "blowing free" takes place entirely without braking sand.

At the same time, it is an advantage when the air channel can be partially or completely closed by means of a blocking device arranged at the air channel inlet. "Closable" is not only understood to mean a discrete "open-closed" however, but also continuous intermediate stages, which therefore increase or decrease the cross-section of the air channel (partial closing).

With regard to the design of the blocking device, the person skilled in the art can choose from a range of known devices.

In an embodiment of the invention, an adjusting screw is used as the blocking device. The cross-section of the air channel is changed by means of this adjusting screw in order to control the distribution of the compressed air—thus to determine the portion which passes through the nozzle and the portion which flows through the air channel. In particular, this control can be carried out by a manual adjustment of the adjusting screw.

In a further embodiment, a blocking device is provided which can be activated by a pneumatic or electrical signal. Signals of such kind are frequently used in rail vehicles; the necessary devices are therefore already available and can easily be supplemented by the signal paths required for sanding.

In an exemplary embodiment of the invention, the blocking device is a closing die which can be moved by means of a solenoid. Here, the solenoid is either a push or pull magnet. Here, push or pull magnet is understood to mean the way in which the solenoid acts on the closing die when it is activated. Accordingly, when activated, a push magnet therefore repels the closing die, while, when activated, a pull magnet attracts the closing die. Advantageously, the air channel outlet is arranged in the first hollow chamber below the venturi pipe. Here, the term below is understood to be from the point of view of an installed suction nozzle insert or in the flow direction of the compressed air stream. For example, see FIG. 1 or 2.

Furthermore, according to the invention, a method of the kind mentioned in the introduction in that the sand discharge device has a suction nozzle insert of the kind mentioned above and metal oxide granulate is used as the gritting material is provided. An exemplary metal oxide granulate is aluminium oxide.

Metal oxides have the advantage that a very much lower quantity is required for correct functioning of the sand discharge device than when quartz sand is used. For example, with aluminium oxide, only one-twentieth of the amount of quartz sand is required in order to achieve the same effect. This effect is also due to the fact that, in contrast to quartz sand, metal oxide granulate is not crushed between rail and wheel when used as a braking medium, but retains its shape and thus increases the braking effect.

BRIEF DESCRIPTION OF THE DRAWINGS

The foregoing summary, as well as the following detailed description of the invention, will be better understood when read in conjunction with the appended drawing. For the purpose of illustrating the invention, there is shown in the drawings certain embodiments of the present invention. It should be understood, however, that the invention is not limited to the precise arrangements and instrumentalities shown. In the drawings.

DETAILED DESCRIPTION OF THE INVENTION

Figure 1:
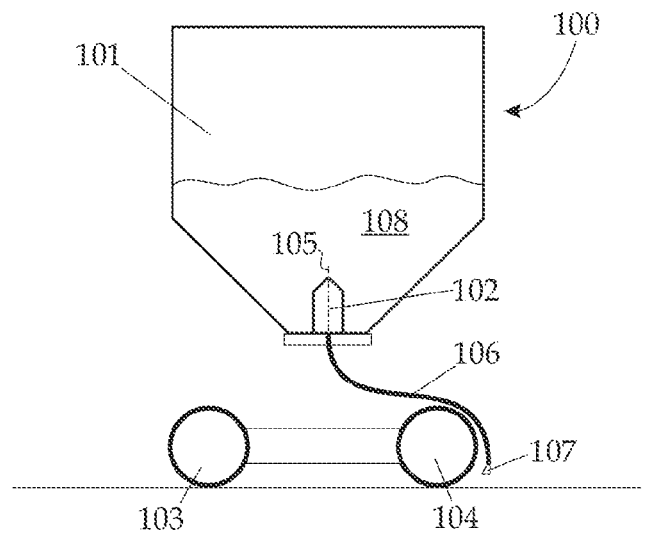
FIG. 1 shows a schematic representation of a sand discharge device according to the prior art.

In describing the embodiments of the invention illustrated in the drawings, specific terminology will be used for the sake of clarity. However, the invention is not intended to be limited to the specific terms so selected, it being understood that each specific term includes all technical equivalents operating in similar manner to accomplish similar purpose. It is understood that the drawings are not drawn exactly to scale.

FIG. 1 shows a schematic representation of a sand discharge device 100 with suction nozzle insert 102 for use on a rail vehicle, which however is only indicated in FIG. 1 by the two wheels 103, 104. The representation is not true to life, but is only intended to illustrate a field of application of the device according to the invention. FIG. 1 shows the prior art.

The sand discharge device 100 has a storage container 101 which is filled with braking sand 108. The braking sand 108 in the container is only suggested in FIG. 1. As already mentioned in the introduction, the term braking sand 108 is used here as a generic term, and as well as the quartz sand frequently used also includes other granular gritting materials such as metal oxides for example (e.g. aluminium oxide). Storage containers 101 can basically be ventilated or designed to be pressure tight; the device according to the invention can basically be used for both variants.

The storage container 101 has a conically tapered bottom section, at the lowest point of which is arranged at least one suction nozzle insert 102 for sand. The suction nozzle insert 102 can be arranged at any point in the storage container 101, but the best results are achieved when it is arranged in the bottom section. In the present exemplary embodiment of FIG.

1, the suction nozzle insert 102 is arranged in such a way that its longitudinal axis 105 is arranged vertically. Basically, it is also possible to fit the suction nozzle insert 102 at an angle so that the longitudinal axis 105 is tilted with respect to the vertical, for example at an angle between 0° and 35°. A plurality of suction nozzle inserts 102 can also be provided.

In the exemplary embodiment described, the description always talks about a vertical arrangement of the suction nozzle insert 102 or of the longitudinal axis 105. With the suction nozzle insert 102, "top" consequently always refers to the top according to the arrangement in FIG. 1; "bottom" is accordingly to be understood as being near the wheels 103, 104.

A sand feed pipe 106, which merges with a sand bell or sand shoe 107, is connected to the suction nozzle insert 102. Braking sand 108 or gritting material is transported via sand feed pipe 106 and sand bell 107 to in front of the wheels 103,104 of the rail vehicle. In the case of bidirectional vehicles, which are therefore operated in both directions of travel, a second suction nozzle insert 102 with a second sand feed pipe 106 and sand bell 107 can also be used in order to be able to transport sand to in front of the wheels 103, 104 in both directions of travel. Such a variant is not shown in FIG. 1 for reasons of clarity.

Figure 2:
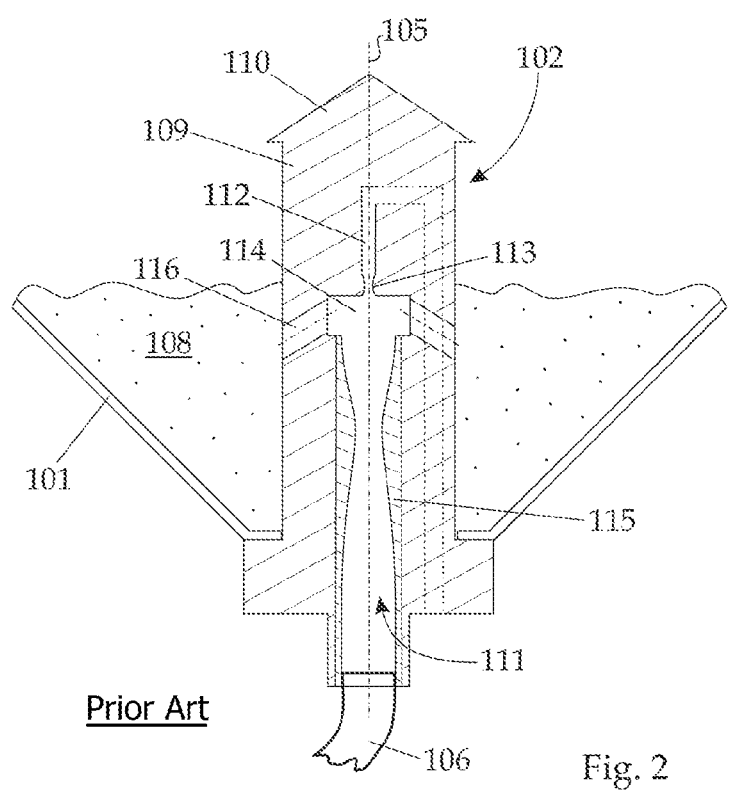
FIG. 2 shows a sectional view of a suction nozzle insert according to the prior art.

FIG. 2 shows a sectional view of a suction nozzle insert 102 according to the prior art, and a part of a storage container 101 with braking sand 108. The suction nozzle insert 102 comprises a housing 109 with a cover section 110. The housing 109 has a first hollow chamber 111 which is open at the bottom to which a sand feed pipe 106 can be connected. A compressed air stream can flow through the suction nozzle insert 102 parallel to its central axis 105. This compressed air stream is fed into the first hollow chamber 111 from above by means of a compressed air pipe 112 through a nozzle 113 and flows successively through an injection chamber 114 and a venturi pipe 115.

The injection chamber 114 is connected to the storage container 101 by at least one suction channel 116. At the same time, the suction channel 116 is angled so that the inner opening in the region of the injection chamber 114 is higher than the outer opening in the storage container 101. This prevents gritting material unintentionally entering the suction nozzle insert 102. The venturi pipe 115 consists essentially of two cones pointing in opposite directions, which are joined at the point of their smallest diameter by a short section flush therewith of constant diameter.

As a result of the pressure conditions caused by the compressed air stream when it flows through the said parts, braking sand 108 is sucked out of the storage container 101 into the injection chamber 114. The braking sand 108 is swept along by the compressed air stream and a sand/compressed air mixture flows through the venturi pipe 115 and the sand feed pipe 106 and is delivered in front of the wheels by the sand shoe 107 (not shown in FIG. 2).

Figure 3:
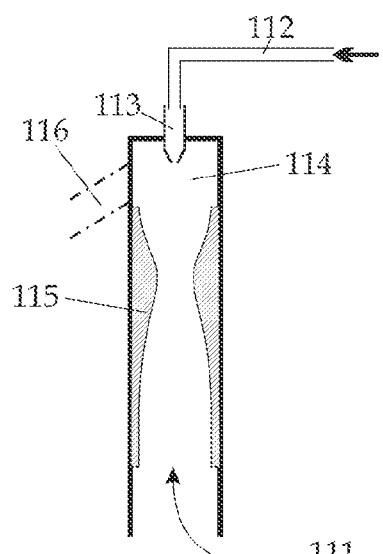
FIG. 3 shows a schematic representation of the parts of a suction nozzle insert through which air flows.

FIG. 3 again shows the arrangement of the components through which the compressed air stream successively flows in schematic view. The compressed air stream, symbolized by an arrow, is fed by means of the compressed air pipe 112 to the nozzle 113 and passes through the nozzle 113 into the first hollow chamber 111 (outlined in bold in FIG. 3). At the top end of the first hollow chamber 111 is the injection chamber 114 which is connected by at least one suction channel 116 to the storage container 101 (not shown in FIG. 3). The venturi pipe 115 is arranged below the injection chamber 114.

Figure 4:
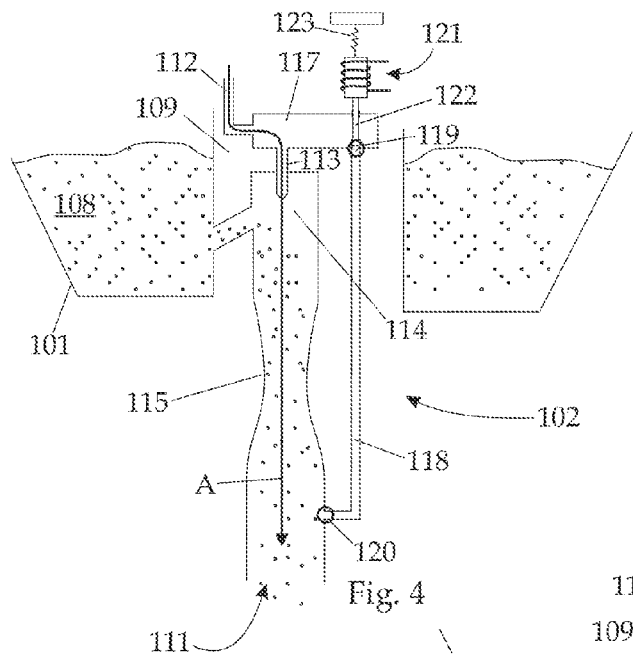
FIG. 4 shows a schematic sectional view of a suction nozzle insert according to the invention.
Figure 5:
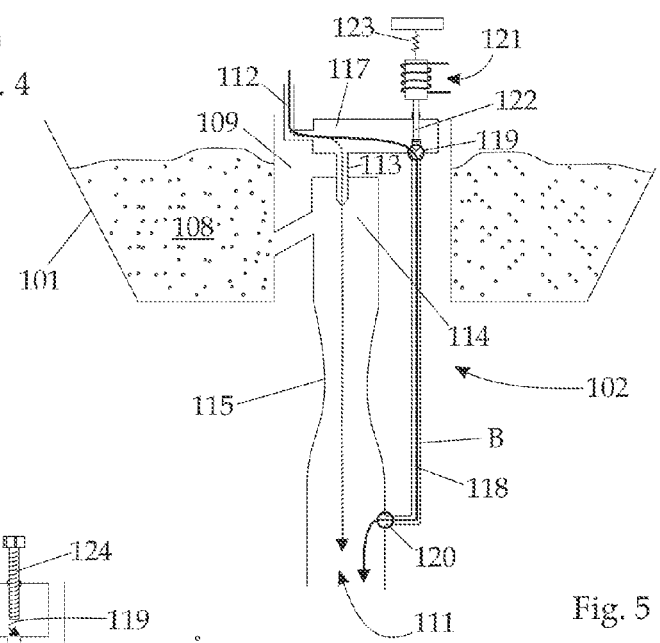
FIG. 5 shows a further schematic sectional view of the invention.
Figure 6:
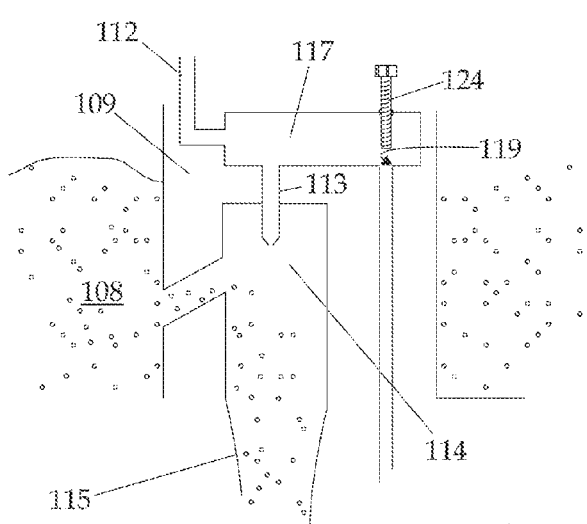
FIG. 6 shows a section of a schematic sectional view of a variant of the invention.

FIGS. 4, 5 and 6 show the suction nozzle insert 102 according to the invention or sections thereof. The form of the suction nozzle insert 102 is only suggested here; the person skilled in the art will be familiar with a large number of realisation options. The suction nozzle insert 102 of FIGS. 1 and 2 is one possible variant realisation. A compressed air stream can likewise flow through the suction nozzle insert 102 according to the invention, namely essentially in the order compressed air pipe 112, nozzle 113, injection chamber 114 and venturi pipe 115.

However, in contrast with the prior art, the suction nozzle insert 102 according to the invention has a second hollow chamber 117. This second hollow chamber 117 is arranged between the compressed air pipe 112 and the nozzle 113. Basically, the second hollow chamber 117 must be arranged at a suitable point in the housing 109, but may be located in the cover section 110 of the housing 109.

As well as by the nozzle 113, the second hollow chamber 117 is connected to the first hollow chamber 111 by at least one air channel 118. Basically, any number of air channels 118 can be provided; for reasons of understandability, FIG. 4 shows a very simple variant with only one air channel 118. Here, the air channel 118 may be arranged parallel to the central axis 115 (not shown in FIGS. 4 and 5) of the suction nozzle insert 102—however, other solutions are of course also possible.

The diameter of the air channel 118 is generously sized compared with the nozzle 113. The nominal size of the air channel 118 and the air channel inlet 119 and outlet 120 is several times the nominal size of the nozzle 113, as a rule at least four times the nominal size of the nozzle, for example a value which is around five or (typically) 10 times; of course, other values from the ranges between the given figures and even values greater than 10 are also possible.

The air channel inlet 119 is located in the second hollow chamber 117, while the air channel outlet 120 is located in the vicinity of the first hollow chamber 111. In the embodiment shown, the air channel outlet 120 is arranged below the venturi pipe 115. Basically, the air channel outlet 120 can also be arranged at a different point from that shown here, in particular further downstream, but not before the narrowest cross section of the Venturi pipe.

The air channel 118 is basically designed to be "closable", wherein here, depending on the variant, "closable" includes both a discrete "open-closed" and also a continuous variation of the cross section of the air channel 118 from completely open via partially closed to fully closed.

In a first variant, which is shown in FIGS. 4 and 5, the air channel 118 is designed to be "discretely closable", and therefore essentially includes the positions "open" and "closed".

Closing can be carried out in various ways. The method selected in FIGS. 4 and 5 with a closing die 122 which is moved by a solenoid 121 is one of several possible variants and is explained in more detail below. Other valve arrangements which are arranged at any point in the air channel 118 between air channel inlet 119 and outlet 120 are also conceivable.

Naturally, when several air channels (not shown) are provided, each air channel can be closed in its own right or designed entirely without a blocking device, or any combination of these embodiments.

The principle of operation of the solution according to the invention in the first variant is as follows: when sanding (see FIG. 4), that is to say when a sand/compressed air mixture is to be discharged, the air channel 118 remains closed, i.e. the closing die 122 closes the air channel inlet 119. The compressed air then moves along the path shown with "A" out of the compressed air pipe 112 through the second hollow chamber 117 and the nozzle 113 into the first hollow chamber 111 where, in the injection chamber 114, it sucks braking sand 108 out of the storage container 101. The sand/compressed air mixture then emerges through the venturi pipe 115 into the sand feed pipe 106 (not shown in FIG. 4).

When the sand feed pipe 106 is to be "emptied" by blowing free with air (see FIG. 5), that is to say when only compressed air and if possible no braking sand 108 is to be fed through the sand feed pipe 106, the air channel 118 is opened. The closing die 122 is raised by means of an electrical pulse. As the diameter of the air channel 118 is several times larger than the nominal size of the nozzle 113, the compressed air flows mainly through the air channel 118. This flow path is shown with "B" in FIG. 5. The original flow path "A" with the closing die 122 closed is shown dotted, as a small amount of air may still follow this path. As the air channel outlet 120 may be located below the venturi pipe 115, the sand feed pipe 106 is blown free without new braking sand 108 flowing in behind it. Due to the loss of the suction effect above the venturi pipe 115, the sand/compressed air mixture used for sanding becomes a pure air stream when blowing out. Blowing out takes approximately 1 to 5 seconds.

This solution has the advantage that there are no moving parts or seals in the sand area which could wear with extended use. This guarantees operation even when used for longer periods.

A first variant of the invention in which a blocking device similar to a solenoid valve is provided (magnetically controlled blocking) is shown in FIGS. 4 and 5. This means that a solenoid 121 is provided which is connected to a spring 123 and a closing die 122. The solenoid 121 can be designed as a push or pull magnet. Depending on the type of design, the air channel inlet 119 is either opened (pull magnet) or closed (push magnet) when the solenoid 121 is activated. In principle, both solutions can be used, wherein the use of a pull magnet could be given preference, as in this case the sanding function is assured even if the solenoid 121 should fail. Basically, as well as the variant shown, any other solutions are possible, for example with pneumatic control.

The closing die 122 must be designed so that the air channel inlet 119 can be reliably blocked; for example, a sealing device can be provided to guarantee the function. As already mentioned, the air channel 118 can also be closed in a different way, for example by fitting a valve in the air channel 118.

In contrast to the first variant in which the air channel 118 can be discretely closed (FIGS. 4 and 5), FIG. 6 shows a second variant in which the air channel 118 can be "continuously closed". This means that the cross section of the air channel 118 or of the air channel inlet 119 can be completely or partially opened or closed.

FIG. 6 shows this second variant in which an adjusting screw 124 is provided as the blocking device. The adjusting screw 124 is arranged so that it can be screwed into the air channel 118 to any depth and thus vary the cross section of the air channel 118. This makes any continuous settings possible from fully open via partial covering of the air channel inlet 119 to fully closed. In this way, the distribution of the compressed air between nozzle 113 and air channel 118 can be controlled.

Thanks to this second variant of the invention, alternative gritting materials such as metal oxides can be discharged particularly easily. Metal oxides are favourable gritting materials, as unlike braking sand they are not crushed after discharging but retain their shape. They therefore have a better braking effect than braking sand and can also exercise this braking effect for longer, as they act to increase braking as long as they remain on the rails. The quantity to be discharged is therefore also less—when aluminium oxide is used, for example, only one twentieth of the quantity of braking sand which is usually necessary must be discharged.

However, metal oxides are several times heavier than braking sand. For example, aluminium oxide is three times as heavy as braking sand and therefore requires an adequate air stream for it to be transported from the storage container 101 through the sand feed pipe 106 to in front of the wheels 103, 104.

Thanks to the invention, with which the air from the air channel 118 is also available in the first hollow chamber 111 as well as the compressed air from the nozzle 113, such a mixture of metal oxide and compressed air can now be discharged in a better manner.

While the principles of the invention have been described above in connection with exemplary embodiments, it is to be clearly understood that this description is made only by way of example and not as a limitation of the scope of the invention.

What is claimed:

1. A suction nozzle insert arranged in a storage container of a sand discharge device of a rail vehicle, wherein the suction nozzle insert comprises a housing having a cover section at a top end of the housing, at least one suction channel leading in an inward direction from the storage container, a first hollow chamber, and a second hollow chamber, the first hollow chamber comprising an injection chamber and a venturi pipe and having an opening at a bottom thereof where a sand feed pipe can be connected, the at least one suction channel connecting the storage container with the injection chamber, the suction nozzle insert being configured such that an air stream supplied by a compressed-air pipe can flow through the second hollow chamber and then parallel to a longitudinal axis of the suction nozzle in succession through a nozzle, the injection chamber, and the venturi pipe towards the opening at the bottom of the first hollow chamber, the suction nozzle insert also comprising at least one air channel provided between the second hollow chamber and the first hollow chamber, the at least one air channel having an air channel inlet in the second hollow chamber and an air channel outlet in the first hollow chamber, the at least one air channel being at least partially closable.

2. The suction nozzle insert according to claim 1, characterized in that the air channel is completely closable.

3. The suction nozzle insert according to claim 1, characterized in that the second hollow chamber is arranged in the cover section.

4. The suction nozzle insert according to claim 1, characterized in that a diameter of the air channel is at least four times a diameter of the nozzle.

5. The suction nozzle insert according to claim 1, characterized in that the air channel can be partially or completely closed by means of a blocking device arranged at the air channel inlet.

6. The suction nozzle insert according to claim 5, characterized in that an adjusting screw is used as the blocking device.

7. The suction nozzle insert according to claim 5, characterized in that the blocking device can be activated by a pneumatic or electrical signal.

8. The suction nozzle insert according to claim 7, characterized in that the blocking device is a closing die which can be moved by means of a solenoid.

9. The suction nozzle insert according to claim 8, characterized in that the solenoid is a push or pull magnet.

10. The suction nozzle insert according to claim 1, characterized in that the air channel outlet is arranged in the first hollow chamber below the venturi pipe.

11. The suction nozzle insert according to claim 2, characterized in that the second hollow chamber is arranged in the cover section.

12. The suction nozzle insert according to claim 2, characterized in that the air channel runs essentially parallel to the longitudinal axis of the suction nozzle insert.

13. The suction nozzle insert according to claim 3, characterized in that the air channel runs essentially parallel to the longitudinal axis of the suction nozzle insert.

14. The suction nozzle insert according to claim 2, characterized in that a diameter of the air channel is at least four times a diameter of the nozzle.

15. The suction nozzle insert according to claim 3, characterized in that a diameter of the air channel is at least four times a diameter of the nozzle.

16. The suction nozzle insert according to claim 1, characterized in that a diameter of the air channel is at least four times a diameter of the nozzle.

17. The suction nozzle insert according to claim 2, characterized in that the air channel can be partially or completely closed by means of a blocking device arranged at the air channel inlet.

18. A method for discharging a gritting material, the method comprising:
discharging a metal oxide granulate gritting material from a sand discharge device of a rail vehicle, the sand discharge device having a suction nozzle insert arranged in a storage container of the sand discharge device, the suction nozzle insert comprising a housing having a cover section at a top end of the housing, at least one suction channel leading in an inward direction from the storage container, a first hollow chamber, and a second hollow chamber, the first hollow chamber comprising an injection chamber and a venturi pipe and having an opening at a bottom thereof where a sand feed pipe can be connected, the at least one suction channel connecting the storage container with the injection chamber, the suction nozzle insert being configured such that an air stream supplied by a compressed-air pipe can flow through the second hollow chamber and then parallel to a longitudinal axis of the suction nozzle in succession through a nozzle, the injection chamber, and the venturi pipe towards the opening at the bottom of the first hollow chamber, the suction nozzle insert also comprising at least one air channel provided between the second hollow chamber and the first hollow chamber, the at least one air channel having an air channel inlet in the second hollow chamber and an air channel outlet in the first hollow chamber, the at least one air channel being at least partially closable.

19. The method according to claim 18, wherein the discharging step is further characterized in that the metal oxide granulate gritting material is aluminium oxide.

20. A suction nozzle insert arranged in a sand storage container for a sand discharge device of a rail vehicle, the suction nozzle insert comprising:
a first hollow chamber comprising an injection chamber, a venturi pipe, and an open bottom where a sand feed pipe can be connected to the first hollow chamber;
at least one suction channel connected to the storage container for storing sand, the at least one suction channel connecting the storage container with the injection chamber;
a second hollow chamber;
a compressed air pipe connected to the second hollow chamber;
a nozzle connected between the second hollow chamber and the injection chamber;
at least one air channel provided between the first hollow chamber and the second hollow chamber, the at least one air channel having an air channel inlet located within the second hollow chamber and an air channel outlet located within the first hollow chamber, the at least one air channel being configurable between a closed position and an at least partially open position;
wherein in the closed position, all of an air stream that is supplied by the compressed air pipe to the second hollow chamber flows sequentially through the nozzle, the injection chamber, and the venturi pipe, and
wherein in the at least partially open position, at least a portion of the air stream that is supplied by the compressed air pipe to the second hollow chamber flows through the at least one air channel.

* * * * *